United States Patent [19]

Applegate et al.

[11] 4,062,928

[45] Dec. 13, 1977

[54] PROCESS FOR THE PREPARATION OF NITRIC ACID

[75] Inventors: James M. Applegate, Granger, Utah; Stanford T. Holbrook, El Paso, Tex.; Wayne A. Proell, Seymour, Ind.; Clifford E. Selin, Salt Lake City, Utah

[73] Assignee: American Hydrocarbon Company, Salt Lake City, Utah

[21] Appl. No.: 778,792

[22] Filed: Mar. 17, 1977

[51] Int. Cl.$^2$ ............................................. C01B 21/40
[52] U.S. Cl. .................................... 423/392; 423/393
[58] Field of Search ........................ 423/392, 393, 394

[56] References Cited

U.S. PATENT DOCUMENTS

| 2,028,402 | 1/1936 | Luscher | 423/393 |
| 2,088,057 | 7/1937 | Handforth | 423/393 |
| 2,142,646 | 1/1939 | Handforth et al. | 423/393 |

FOREIGN PATENT DOCUMENTS

| 1,248,311 | 10/1960 | France | 423/394 |

*Primary Examiner*—G. O. Peters

[57] ABSTRACT

A process for the preparation of nitric acid from nitrogen oxides, oxygen and water which utilizes an aqueous stripping liquid having a nitric acid content within a specified range which passes through a reaction zone. By controlling the process parameters within specified ranges three regions are provided with the reaction zone.

15 Claims, 4 Drawing Figures

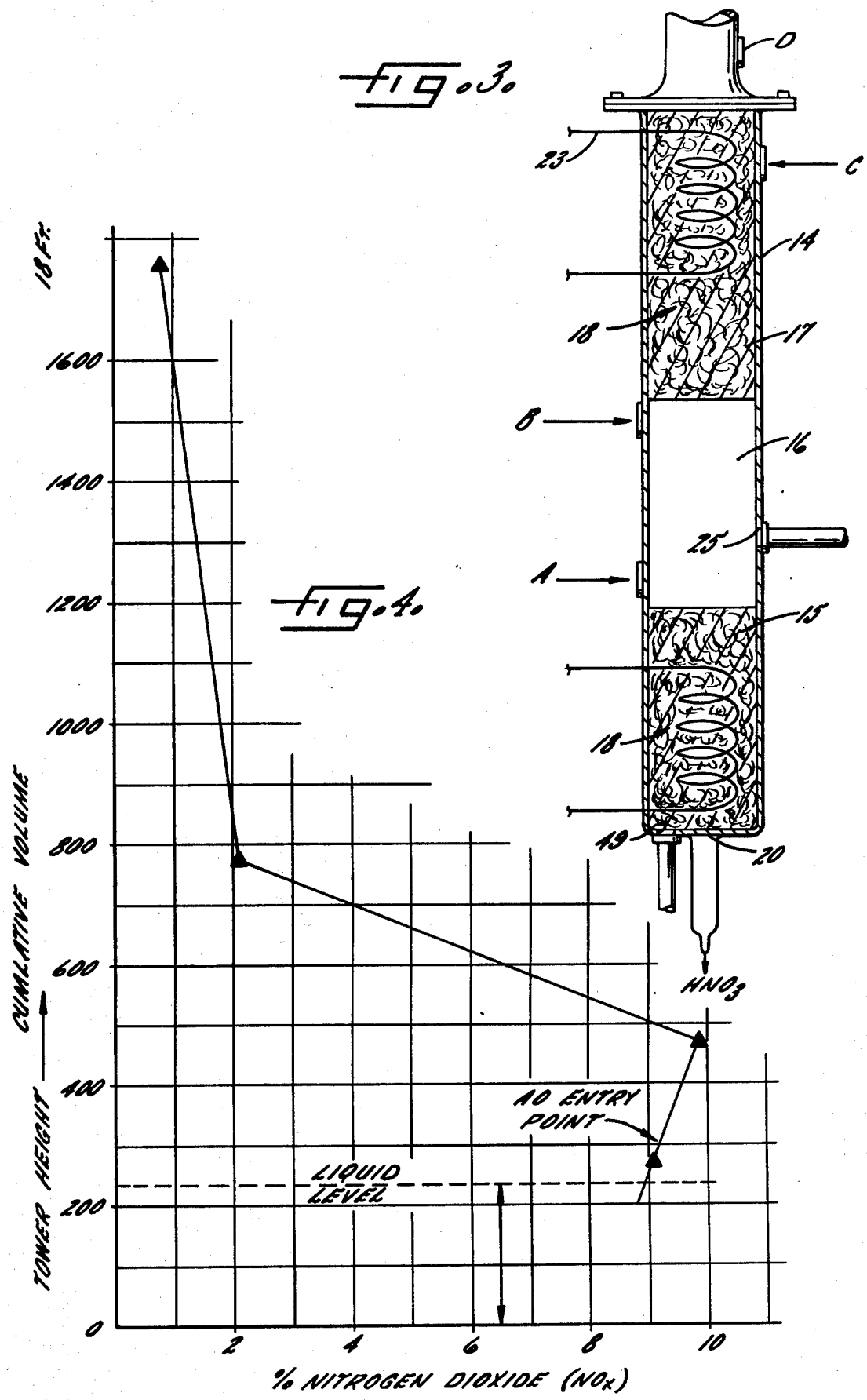

PROCESS FOR THE PREPARATION OF NITRIC ACID

BACKGROUND OF THE INVENTION

This invention relates to a process for the preparation of nitric acid and, more particularly to an atmospheric pressure process for the conversion of nitrogen oxides to nitric acid in a relatively small reaction zone as compared to those employed in existing atmospheric pressure processes.

Most commercially available nitric acid is produced by the first step of oxidizing ammonia to form nitrogen oxides, followed by absorption of the nitrogen oxides into water to form nitric acid. In the first step, the ammonia is initially converted to nitric oxide by oxidizing the ammonia in the presence of excess oxygen over a suitable catalyst such as a platinum gauze catalyst. The ammonia oxidation is exothermic, with water being a by-product. In balanced form, the equation for this reaction is:

$$NH_3 + 1.25O_2 = NO + 1.5H_2O \qquad (1)$$

The nitric oxide formed in reaction (1) is then oxidized to form nitrogen dioxide. The reaction is relatively slow and homogeneous and proceeds according to the equation:

$$2NO_{(g)} + O_{2(g)} = 2NO_2 \qquad (2)$$

Below 150° C, the equilibrium constant strongly favors the formation of nitrogen dioxide (and its dimer, nitrogen tetroxide) so that almost all nitric oxide will combine with any oxygen present to form nitrogen dioxide (and its dimer nitrogen tetroxide).

In the latter step, nitrogen dioxide (or its dimer nitrogen tetroxide) is absorbed in water to produce the nitric acid. The equation for this reaction is:

$$3NO_{2(g)} + H_2O_{(liq.)} = 2 HNO_{3(aq)} + NO_{(g)} \qquad (3)$$

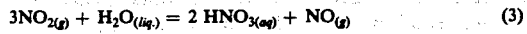

As can be seen, additional nitric oxide is produced in this reaction. The nitric oxide produced in this reaction then combines with any oxygen present to form nitrogen dioxide (and its dimer nitrogen tetroxide) according to reaction (2). The nitrogen dioxide thus formed absorbs in any water present and additional nitric oxide is released. For every three moles of nitrogen dioxide that is converted to nitric acid in reaction (3), one mole of nitric oxide is released. As the concentration of nitric oxide gets smaller and smaller, reaction (2) goes more and more slowly; and, in fact, never of itself goes to completion. However, in any commercial process the last traces of nitric oxide should be removed from the exhaust gases so that these gases will be within the standards set by the Environmental Protection Agency for pollutants and also to minimize the economic penalty paid when the nitric oxide, a reactant, is lost to the atmosphere. Heretofore, removal of the last nitric oxide has been accomplished by the use of increased operation pressures and/or the use of large reactor volumes.

The reaction between nitric oxide and oxygen is a third order reaction and its reaction rate will increase as the square of the pressure. The residence time for a given quantity of gas (by weight) in passing through a reactor of given volume increases in direct proportion to the pressure. It follows that the volume of the oxidation space to accomplish a given degree of oxidation of nitric oxide would be inversely proportional to the cube of the pressure. For a pressure of 8 atm, the reactor volume required would be only 1/512 of that necessary at atmospheric pressure. Of course, the pressure equipment required is expensive to construct and maintain.

One process utilizing elevated operating pressures is that developed by DuPont. A good summary of this process and its development is given in T. H. Chilton, Chem. Eng. Prog. Monograph Series No. 3, Vol. 56, Am. Inst. Chem. Eng., N.Y. (1960).

In a plant employing the "DuPont Process", air is compressed to about between 50 and 125 psig, preheated to about 250° C, and mixed with ammonia vapor. The mixture, containing about 10% ammonia by volume, flows down through a pack of flat gauzes producing nitric oxide at an efficiency of about 95% at a temperature of about 900° C. The hot gas leaving the gauze is cooled by exchange with the feed air and in a tail-gas reheater before flowing to a cooler-condenser. Weak acid produced in the condenser is pumped to an intermediate tray of the absorption tower while the uncondensed process gas flows in the bottom. The absorption tower consists of a series of bubble cap trays provided with cooling coils for removing the heat of reaction. As the gas flows up the tower countercurrent to the acid flow, nitrogen dioxide dissolves in water forming nitric acid and releasing nitric oxide, which is reoxidized in the space between the trays by the excess oxygen present. Steam condensate is added to the top of the tower as the absorbent; dissolved nitrogen oxides are removed from the product acid by contact with secondary air in a "bleaching" tower. The tail gas leaving the absorption tower is reheated to about 250° C by exchange with the process gas and then expanded through a gas engine which provides up to about 40% of the power required for driving the reciprocating air compressors. Typically such a plant will produce 250 tons a day of 100% nitric acid at a volumetric efficiency of about 85 to 90 pounds of 100% nitric acid per day per cubic foot of reactor.

The alternative to the use of elevated pressure to minimize the amount of nitric oxide in the exhaust gases is to use a series of reactors to oxidize the nitric oxide to nitrogen dioxide. In this process, the exhaust gas containing the regenerated nitric oxide is fed into a second reactor where it is contacted with additional oxygen and water to form nitric acid and, of course, additional regenerated nitric oxide, which is in turn fed into a third reactor; and the process is repeated until the nitric oxide level in the exhaust is practically eliminated.

As can be appreciated, each of these techniques has its drawbacks. The use of large reactor machines requires not only considerable capital investment, but also increases the retention time of gas in the reactor. Increasing the operating pressure also increases the gas retention time and further necessitates the use of pressure equipment which is costly to install and maintain.

It is, therefore, an object of this invention to provide a process for the preparation of nitric acide from nitrogen oxides which virtually eliminates regenerated nitrogen oxides in the process exhaust gases.

Another object of this invention provides a process of the type described herein which can be operated at essentially atmospheric pressure with relatively small reactor volumes.

It is yet another object of this invention to provide such a process that operates in a single gas-liquid contacting reaction zone.

Still another object of this invention lies in the provision of a process as described herein which is capable of achieving yields of 85% and greater, of 100% nitric acid.

A further object of this invention is to provide such a process characterized by its ability to effectively react dilue concentrations of nitrogen oxides.

Yet another object provides an integral process as described herein for efficiently and economically converting ammonia to nitric acid.

BRIEF DESCRIPTION OF THE DRAWINGS

Other objects and advantages of the process will become apparent in the following description and accompanying drawings in which:

FIG. 3 depicts a cross sectional side view of an apparatus having ports through which gas samples can be removed for analysis; and FIG. 4 is a graph with the concentration of nitrogen oxides measured in the gas phase being its ordinate and the reactor volume being its abscissa.

BRIEF DESCRIPTION OF THE INVENTION

Figure 1:
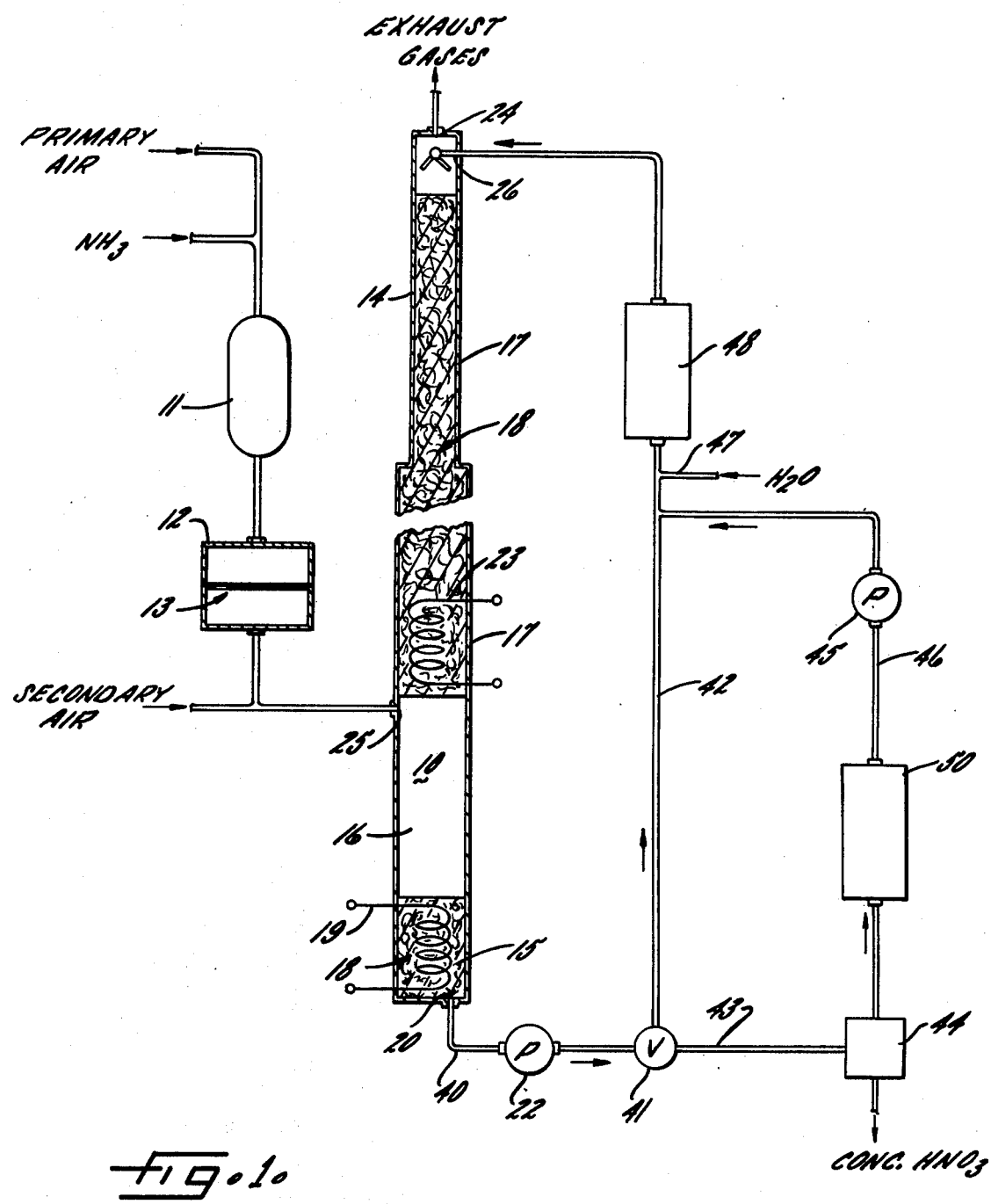
FIG. 1 depicts a cross sectional side view of one embodiment for carrying out the herein described invention.

To avoid the problem of the ever decreasing concentration and resulting decrease in the reaction rate of the conversion of regenerated nitric oxide to nitrogen dioxide, the process of the present invention, in general, utilizes an aqueous stripping liquid having a nitric acid content within a specific range which passes through a reaction zone. By appropriately maintaining the temperature of the stripping liquid and by coordinating it with the other process parameters, a stripper region within the reaction zone for absorbing reaction products including nitrogen dioxide and a desorbing region within the reaction zone for removing dissolved gaseous reaction products from the stripping liquid are provided which concentrate the nitrogen oxides into a concentration region between the stripper region and the desorber region wherein the conversion of nitric oxide to nitrogen dioxide or its dimer is relatively fast. This stripping liquid, serving as a first stream, provides a sufficient liquid level in the reaction zone to at least give a gas seal. A second stream is continuously removed from the desorbing region and is separated to form a recycle stream and an eventual product stream.

The overall conversion of nitrogen oxides to nitrogen dioxide or its dimer by means of concentrating the nitrogen oxides is fast and efficient and eliminates the need for some of the equipment associated with the present commercial processes such as expensive large volume reactors and high pressure equipment. Further, the concentration of the nitrogen oxides in the reactor also speeds the conversion of the nitrogen dioxide or its dimer to nitric acid.

While the invention is susceptible to various modifications and alternative forms, a preferred embodiment thereof has been shown in the drawings and will be described in detail hereinafter. In this embodiment, a single, vertical tower serves as the reaction zone and carries out various functions including gas-liquid contacting for stripping and the like. It should be understood, however, by those skilled in the art that it is not intended to limit the invention to the particular form disclosed, but, to the contrary, the intention is to cover all modifications, equivalents, and alternatives falling within the spirit and scope of the invention. For example, it should be appreciated that a horizontal-oriented, gas-liquid contact apparatus, as is known, may be employed in the place of the vertical apparatus of the preferred embodiment herein disclosed without departing from the scope of the present invention. In addition, while the embodiment illustrated sets forth a process wherein the nitrogen oxide reactant is formed as the first step of an integral process by oxidizing ammonia, this advantageous step need not be incorporated. Any source of nitrogen oxides may certainly be utilized.

DETAILED DESCRIPTION OF THE DRAWINGS

Turning now to FIG. 1 of the drawings, there is shown an integral process for converting ammonia to nitric acid. To provide the nitrogen oxide reactant source, ammonia is first oxidized to nitrogen oxides as is well known. Thus, as is shown, ammonia and a primary source of molecular oxygen, such as air, are combined, heated and admixed in a conventional gas mixer 11. A slight excess of molecular oxygen over that which is theoretically required to convert the ammonia to nitrogen oxides is employed.

The mixed molecular oxygen-ammonia gas is then reacted to form a mixture of nitrogen oxides by passing the oxygen-ammonia mixture into a conventional burner reactor 12 which has been provided with a conventional heated platinum gauze catalyst 13. The oxygen-ammonia gas mixture is passed over the heated platinum gauze catalyst to convert the ammonia to nitrogen oxides, principally nitric oxide and nitrogen dioxide.

To convert the ammonia oxidation products to nitrogen dioxide or its dimer, these gaseous products are continuously introduced into the concentration region of the reaction zone. Thus, as is shown in FIG. 1, the nitrogen oxide products exiting from the burner reactor 12 are continuously introduced into a reaction zone comprising reactor 14 at the concentration region 16 via inlet 25. The limits defining the concentration region and the overall gathering or concentrating of the nitrogen oxides into this region will be described hereinafter as the description proceeds. In accordance with a preferred embodiment, these products are combined with a supplemental source of oxygen such as air, and shown as secondary air in FIG. 1, to insure that adequate oxygen will be present for conversion of the products to nitrogen dioxide or its dimer. The secondary air is preferably mixed with the products prior to entry into the reactor, as is shown. Reactor 14 is desirably a conventional vertical and generally cylindrical stripper-reactor.

The temperature of the incoming products gases, with or without the secondary air, is not particularly critical. It has been found suitable to employ temperatures such that the temperature of the gases in the concentration region are typically below about 300° F. This temperature is dependent upon several factors including the temperature of the aqueous nitric acid in the stripper region 17, the temperature of the aqueous nitric acid in the desorber region 15, the amount of nitrogen oxides and oxygen introduced into the reactor (since the reactions that convert nitrogen oxides to nitric acid are exothermic) and the temperature of the incoming nitrogen oxides-oxygen mixture. Suitable results have been achieved when the temperature of the incoming nitrogen oxide-oxygen mixture is in the range of from about 100° to about 200° F.

In accordance with one aspect of the present invention, at least a portion of the concentration region is completely devoid of any packing or the like. This allows optimum mixing of the gases during conversion to nitrogen dioxide or its dimer. Thus, in accordance with the preferred embodiment, the incoming gases are introduced into free space 10 via inlet 25.

To provide a carrier for the nitric acid that is ultimately produced in the reaction zone and to allow for the concentrating of the nitrogen oxides into the reaction zone and to allow for the concentrating of the nitrogen oxides into the concentration region, a further and important aspect of this invention provides a stripping liquid which is continuously introduced into the stripper region of the reaction zone so that the stripping liquid, termed herein the first stream, passes through the stripper region and the concentration region and into the desorber region. Thus, in accordance with this invention, the stripping liquid consists of aqueous nitric acid having a nitric acid content of from about 10 to about 40%, preferably about 20 to about 30%.

By suitable maintenance of the temperature of the first stream as it passes through the reaction zone, and in accordance with a still further and important aspect of the present invention, a stripper region within the reaction zone for absorbing reaction products including nitrogen dioxide, a desorbing region within the reaction zone for removing dissolved gaseous reaction products from the stripping liquid, and a concentration region between the stripper region and the desorber region are achieved with the nitrogen oxides being continuously directed to the concentration region from the stripper and desorbing regions.

To this end, as seen in FIG. 1, the first stream is introduced into the stripper region 17 that is formed via inlet 26. The temperature of the first stream in this region is maintained in the range of from about 40° to about 105° F. If the temperature of this region is too high, the nitrogen oxides moving out of the concentration region will move upward in the reactor and extend past the inlet 26 through which aqueous nitric acid is introduced into the reactor. If this occurs, some of the nitrogen oxides will not be dissolved by the aqueous nitric acid but will instead be lost in the exhaust gases. It has been found that little or no unreacted nitrogen oxides are lost in the exhaust gases if the temperature of the gas and liquid in the stripper region are maintained below about 105° F. It should be appreciated that the length of the stripper region should be such that the gases in this region can be maintained below about 105° F.

While this temperature range may of course be achieved by introducing the first stream which is suitably cooled, it has been found desirable to provide a cooling means positioned in the stripper region 17. Any suitable means may be used; and, as shown, a cooling coil 23 may desirably serve this purpose.

To achieve optimum results, it is desirable to introduce the first stream into the stripper region in such a fashion that optimum gas-liquid contact is provided between the first stream and the gases containing unreacted nitrogen oxides which reach the stripper region. Thus, and to this end, the first stream is introduced in the form of a spray or as small droplets; and optimum gas-liquid contact is accomplished by situating in the stripper region a packing or the like providing a relatively large surface area. Any inert packing providing a relatively large surface area and having a high void content may be utilized, as for example, conventional bubble plates, glass Raschig rings, Berl saddles or stainless steel shavings. Preferably, stainless steel shavings are employed since the highest yields of nitric acid were obtained therewith. In FIG. 1, the packing is designated as 18.

The gases, freed of substantially all of the unreacted nitrogen oxides by contact with the first stream, are allowed to vent to the atmosphere as exhaust gases via outlet 24 from the stripper region 17.

In accordance with yet another aspect of the process of this invention, and as has been briefly referred to herein, a desorber region is formed which includes a gas seal for the reaction zone and which serves to liberate at least a major amount of the dissolved gaseous products including nitrogen oxides prior to removal from the reaction zone of any nitric acid stream. To this end, the first stream is introduced into the stripper region at a rate sufficient to allow maintenance of a predetermined level of the first stream of liquid in the desorber region sufficient to hold the temperature thereof in the range of to at least about 130° and preferably at least about 180° F. In the preferred form this predetermined liquid level should be sufficient to allow desorption of gases in the desorber region. The temperature of this liquid may be as high as and can reach its boiling point. In this fashion, most or all of the gases such as the unreacted nitrogen oxides can be directed towards the concentration zone. As shown in FIG. 1, a desorber region 15 is provided; and the liquid retained is heated by any conventional means, such as by the illustrative heating coil 19.

In accordance with a preferred aspect of the present invention, the desorber region includes packing or the like to prevent the establishment of convection currents which might allow dissolved nitrogen oxides in significant amounts to be removed from the reaction zone. Thus, packing 18 is provided for this purpose. Any of the conventionally known means for preventing eddy currents in liquids may be used, such as, for example, perforated plates.

To delineate the interface between the stripper and concentration regions on the one hand, and the concentration and desorber regions on the other, it should be appreciated that this is principally defined by the temperature gradients existing within the reaction zone. Thus, in relation to the interface between the stripper and concentration regions the concentration region begins in the area where the first stream of liquid passing through the stripper region has reached a temperature of at least about 110° F, preferably 120° F. Regarding the concentration and desorber regions, the interface is defined as the area where the liquid is at a temperature of about 130° F, preferably about 150° F.

The conversion of the nitrogen idoxide or its dimer formed to nitric acid is, of course, achieved by reaction with the water present in the first stream passing through the reaction zone as well as by the water formed in the reactions occurring in the reaction zone. Thus, principally in the concentration region the nitrogen oxides and oxygen react in the presence of the water to produce gaseous reaction products including nitrogen dioxide and liquid reaction products, principally nitric acid. The nitric acid produced will combine with the first stream of aqueous nitric acid to enrich the nitric acid content thereof while the gaseous reaction products will tend to disappear in three distinct ways.

First, any nitrogen dioxide produced will generally and subsequently react with the water present in the first stream of aqueous nitric acid to form additional nitric acid. As with the nitric acid in the liquid reaction products, this nitric acid will combine with the first stream of aqueous nitric acid to enrich the nitric acid content thereof.

Secondly, some of the gaseous reaction products will dissolve in, but not react with, the first stream. These dissolved and unreacted gases are prevented from being carried out of the reaction zone by the operation of the desorber region 15 which liberates these gases and forces the dissolved and unreacted gaseous reaction products out of the liquid as gases and directs them back upward into the concentration region. To facilitate desorption of the gases in this region a heating means 19, as for example a steam coil, may be employed to heat the liquid in this zone.

Third, some gaseous reaction products will pass up the reaction zone to the stripper region and exit as exhaust gases through outlet 24. The stripper region functions to absorb these gases and thereby minimize the amount of unreacted nitrogen oxides in the exhaust gases to an acceptable level.

The combined effect of the introduction of the first stream of cold aqueous nitric acid, the cooling in the stripper region 17 and the heating of the liquid in the desorber region 15 is to concentrate the nitrogen oxides, particularly nitrogen dioxide and nitric oxide, and the oxygen in and about the concentration region 16 of the reactor so that the nitrogen dioxide can react to form nitric acid and the nitric oxide can react to form nitrogen dioxide.

By continuously concentrating the nitrogen oxides in this fashion, it has been found that the problems discussed herein caused by the regeneration of nitric oxide in the reaction of nitrogen dioxide with water to form nitric acid have been overcome. Thus, since the nitrogen oxides including the regenerated nitric oxide are continuously being concentrated, the oxidation of nitric oxide to form nitrogen dioxide is not hindered by low concentrations. Moreover, since the regenerated nitric oxide is effectively stripped from the exhaust gases and is continuously being reconcentrated in the reaction zone, the process reaches a state of dynamic equilibrium in which the nitric oxide continuously reacts with oxygen to form nitrogen dioxide which in turn reacts with water to form nitric acid.

This is accomplished without the use of elevated operating pressures or a successive series of reactors as is characteristic of present processes.

To obtain product nitric acid, the second stream is removed from the liquid of the first stream in the desorber region in an amount and at a rate that is coordinated with that of the first stream being introduced into the stripper region so that the requisite amount of liquid is retained in the desorber region. This second stream may be conventionally concentrated to provide nitric acid of the desired concentration.

In accordance with a prime aspect of the present invention, the second stream is separated into a produced stream that may be concentrated, if desired, and a recycle stream, which serves as the source for the first stream. As some water is withdrawn with the product stream, water in an amount and at a rate equal to or greater than the amount and rate of the water withdrawn in the product stream must be added to this recycle stream to maintain the liquid level in the reaction zone as well as to maintain the nitric acid concentration thereof in the range of from about 10 to 40% by weight. In this fashion, the continuous reaction is maintained without the need for adding any fresh dilute aqueous nitric acid except during process start-up.

Yet another aspect of the preferred embodiment of this invention utilizes the water extracted in the concentrating of the products stream to serve as the diluent for the nitric acid enriched recycle stream to minimize the amount of new water that must be added to maintain the desired nitric acid concentration in the first stream.

To this end, as is shown in FIG. 1 a second stream 40 is withdrawn from the reaction zone via outlet 20 and is directed by pump 22 to valve 41 where the second stream is separated into a product stream 43 and a recycle stream 42. Valve 41 directs the recycle stream to the stripper region 17 to serve as the first stream and the product stream to concentrator 44. The water removed from concentrator 44 is first cooled in a heat exchanger 50 and then pumped to recycle stream 42 by pump 45, via line 46. Water from an additional source, not shown, may be added to recycle stream 42, via line 47. Before being returned to the stripper region 17 of reactor 14 as the first stream, the recycle stream 42 may be cooled by any conventional cooling means, as for example a heat exchanger, which is shown in FIG. 1 at 48.

Figure 2:
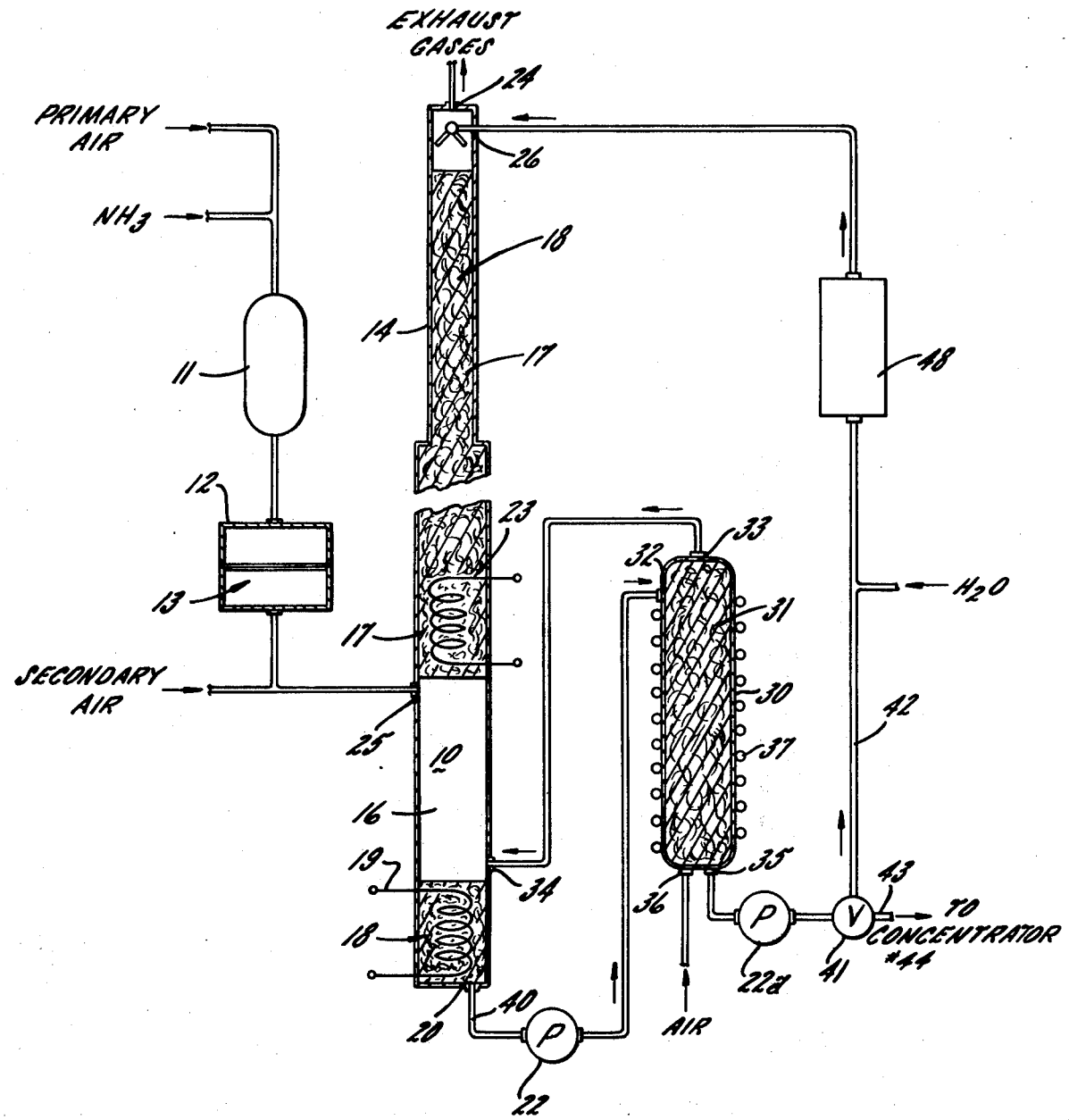
FIG. 2 depicts a cross sectional side view of a further embodiment for carrying out the herein described invention.

While the desorber region is preferably an integral part of the reactor employed, a desorber unit, separate and spatially removed from reactor 14, may also be utilized. An embodiment of this type is shown in FIG. 2. Inasmuch as most of the elements remain the same, the identical numerals have been used.

The operation of the embodiment illustrated in FIG. 2 is the same as the FIG. 1 embodiment, except for the function of the desorber unit 15. In this embodiment, part or all of the function of the desorber region 15 may be carried out by the tower 30. Thus, in one mode of operation, the desorber region 15 need not be heated, and the amount of liquid therein need only be adequate to provide a gas seal. In this mode, the liberating of the unreacted nitrogen oxides is achieved in the separate tower 30.

Alternatively, if desired, the desorbing function may be partially carried out in desorber region 15 and the remainder accomplished in tower 30. In this mode of operation, as in the operation of the FIG. 1 embodiment, the desorber region 15 is heated and more than the minimum amount of liquid is maintained therein. This mode is particularly desirable where the capacity of the desorber region 15 is inadequate to accomplish complete desorbtion.

Turning now to FIG. 2, the second stream is removed from reactor 14 via outlet 20 and directed by pump 22 to inlet 32 in tower 30. Tower 30 may suitably comprise a generally cylindrical, vertical tower having packing 31, similar to that employed in the stripper region 14. The aqueous nitric acid passes down the tower by force of gravity and through the packing 31. The aqueous nitric acid in the tower is maintained at a temperature of at least about 130° F, preferably about 180° F by suitable heating means such as the steam coil jacket 37.

As the aqueous nitric acid passes down through the heated tower, any unreacted gases dissolved in the liquid are liberated or desorbed. These liberated gases mix with the air introduced into the tower through inlet 36 and pass upward through the packed tower and out through outlet 33 as secondary feed gases. These secondary feed gases are then returned to the reactor 14 for conversion to nitric acid by means of inlet 34 in reactor 14. A stream of aqueous nitric acid, after the unreacted gases have been desorbed, is withdrawn from the tower 5 through outlet 35. The withdrawn stream passes to pump 22a and then to valve 41 where it is separated into a product stream and a recycle stream. The product stream may be then concentrated in the manner described above with respect to the FIG. 1 embodiment.

In both the FIG. 1 and FIG. 2 embodiments, it is desirable to withdraw the product stream (expressed as 100% nitric acid) at a rate equal to the amount of nitric acid (also expressed as 100% nitric acid) that is produced in the process. Further, to efficiently extract the gaseous reaction products from the gases rising in the column, the amount of nitric acid recycled to the reactor, and forming the first stream, must be controlled. For example, in the reactor shown in the embodiments disclosed, a ratio of 20 to 1 by volume of gases rising in the column to acid (22% concentration) has been found to strip at least 96% of the gaseous reaction products from the exhaust gases.

As discussed herein, the continuous concentration of the nitrogen oxides contributes to the higher reaction rates and yields obtained with the present process. That a concentration of the nitrogen oxides is effected by the present process is shown by FIGS. 3 and 4 and by the data given below in Example 4.

The feed gases from the catalytic ammonia oxidation reactor in Example 4 were analyzed and were found to contain 9.86% NOx. The apparatus used in Example 4 is shown in FIG. 3. Additional air was introduced at the base of the reactor through inlet 49 and admixed with the nitrogen oxides-oxygen feed gas mixture entering the reactor 14 through inlet 25. As shown in FIG. 3, the reactor was provided with ports through which gas samples could be withdrawn from the reactor and analyzed, these ports being identified as points, A, B, C and D.

The gas port at point A was between the inlet 25, through which the nitrogen oxides-oxygen feed gas mixture entered the reactor 14, and the liquid level in the desorber region 15 of the reactor. The gas port at point B was just below (approx. 2.5 inches) the packing 18 in the stripper region 17 of the reactor. The gas port at point C was in the packing 18 in the stripper region 17 just below (approx. 6 inches) the point at which two portions of the reactor were joined. This gas port was adjacent to the cooling coil 23 in the stripper region 17. The gas port at point D was at a point just above where the two portions of the reactor were joined.

Analysis of the gas sample taken from gas port B showed that the concentrations of $NO_x$ in the reactor at this point was 9.92%. As can be calculated by the dilution of the inflowing gas, wherein 86% of gas containing 9.86% $NO_x$ is admixed with 14% additional air, the admixed gases at this point in the reactor should contain 8.46% $NO_x$. Actual analysis shows that the admixed gases contain 9.92% $NO_x$. Thus, it can be seen that the process of the invention concentrates the nitrogen oxides despite the competing process of conversion of $NO_x$ to $HNO_3$.

The process of the present invention herein described may be further illustrated by means of the following examples, which are intended to be illustrative of, but not in limitation of, the scope of the invention. The yield of nitric acid, in the following examples, was based upon the ammonia fed into the ammonia oxidation burner, calculating the amount of nitric acid which should be formed in accordance with the following equations:

$$NH_3 + 1.25O_2 + NO + 1.5 H_2O$$

$$2NO + O_2 + 2NO_2$$

$$3NO_2 + H_2O = 2HNO_3 + NO$$

This theoretical amount was then compared with the amount of nitric acid actually formed to determine a percentage yield.

EXAMPLE 1

Ammonia at a rate of 110.9 grams per hour and air which had been dried, and with the carbon dioxide removed, at a rate of 1323 grams per hour were fed into a conventional gas mixer and then into a catalytic reactor fitted with a platinum gauze catalyst. The platinum gauze catalyst was a circular disc 3 inches in diameter, and was formed from, by weight, a 90% platinum-10% rhodium wire, having a diameter of 0.003 inches, and had a mesh size of 80 × 80. The platinum gauze catalyst was maintained at a temperature of about 1630° F. The reaction of the ammonia and oxygen from the air was initiated by heating a small spot in the platinum wire catalyst with a small electric arc. After initiation, the reaction spread slowly over the rest of the wire gauze. This took between one and two minutes. The composition of the off-gases from the catalytic burner was measured by conventional gas phase chromatography techniques and was found to be as follows:

|  | Percent by Weight |
|---|---|
| Oxygen & Argon | 1.00 |
| Nitrogen | 81.00 |
| Nitrogen Oxides (reported as $NO_2$) | 17.50 |
| Nitrous Oxide | 0.61 |

The reaction products containing nitrogen oxides from the catalytic reactor was then admixed with additional air, added at a rate of 272 grams per hour. The temperature of the resultant gas stream was about 150° F. This gas stream was then fed into a generally cylindrical vertical countercurrent tower reactor. This reactor was made from stainless steel and was approximately 193 inches in height. The lower 49 inch portion of this reactor was approximately 4 inches in diameter with the upper 144 inch portion was approximately 3 inches in diameter. The volume of this reactor was about 1787 cubic inches.

The interior of the tower was provided with a section containing stainless steel shavings as a packing that was spaced 18 inches from the bottom of the tower and was supported by means of a stainless gauze which extended across the inside of the tower. This packed section extended to the top of the tower. The volume of this packed portion of the counter-current tower reactor was about 1540 cubic inches. The unpacked 18 inch lower section of the tower below the packed section contained liquid to a level of 6 inches. The base of the tower was provided with an outlet that was approximately ½ inch in diameter so that the effluent liquid could be withdrawn from the tower. In the wall of the tower in the unpacked lower portion of the tower just below the packed section was located the inlet through which the gas stream from the ammonia-oxygen burner, with added air, was admitted to the tower.

An inlet approximately ¼ inch in diameter was located in the wall of the tower about 2 inches from the top of the tower through which an aqueous nitric acid solution was admitted to the tower. As the reaction proceeded the aqueous nitric acid solution was continuously fed into the countercurrent tower reactor through this inlet at a rate of about 14,060 grams per hour. At the top of the tower an outlet approximately ¼ inch in diameter was provided through which the exhaust gases passed out of the tower. The liquid in the lower section of the tower was maintained at about 135° F.

The temperature of the packed section of the tower reactor just above the wire gauze supporting the packed section of the tower was determined by thermocouple to be about 101° F. while the temperature of this packed section at the top of the tower near the nitric acid inlet was determined by thermocouple to be about 50° F.

After the gaseous products from the ammonia oxidation with added air had been admitted to the tower and the reaction had proceeded for a while the temperature in the unpacked portion just beneath the packed section was determined to be about 146° F.

As the reaction proceeded an aqueous nitric acid solution was continuously recycled to the unit by collecting the effluent from the reactor which passed out of the tower through the outlet in the base of the unit. Before the reaction was initiated 1324 grams(100% $HNO_3$) of nitric acid was charged to the countercurrent tower reactor. This acid was added as a 24.3% aqueous solution. As previously maintained the recycle rate of this aqueous solution of nitric acid was about 14,060 grams per hour. The effluent from the reactor may contain some dissolved nitrogen oxides. These unreacted nitrogen oxides may be stripped from the effluent and returned to the tower reactor. To accomplish this the effluent from the tower reactor was passed into a second stainless steel tower which was approximately 96 inches in height and 2 inches in diameter and had a volume of approximately 261 cubic inches. The second tower was packed with the same stainless steel shavings as employed in the packed sections of the tower reactor. The effluent was introduced into the top of this second packed tower by means of an inlet ⅜ of an inch in diameter and located in the wall of the tower about 3 inches from the top of the tower and allowed to pass down through the packed tower by means of gravity. The second tower was fitted with a steam jacket so that the temperature of the tower could be maintained at least about 150° F so that any nitrogen oxides dissolved in the effluent would be desorbed as a gas. The desorbed gases passed up the tower and out of it through an outlet in the top of the tower which was approximately ¼ inch in diameter. These desorbed gases were returned to the reactor for conversion to nitric acid by means of an inlet in the reactor about ¼ inch in diameter and located in the wall of the reactor just above the liquid in the bottom of the tower reaction which was about 6 inches above the bottom of the reactor. A stream of aqueous nitric acid was withdrawn from this second tower through an outlet, approximately ¼ inch in diameter, which was located in the bottom of the second tower. This withdrawn stream of aqueous nitric acid was cooled to about ambient temperature and recycled by means of a conventional pump to maintain the countercurrent flow of aqueous nitric acid in the reactor. After 4 hours of reaction time the amount of acid removed from the unit was 2787 grams (100% $HNO_3$) and the concentration of the acid recovered was 27.4% the acid produced was 1463 grams (100% $HNO_3$) and represented a yield of 85.9%. It was found that the exhaust gases from the tower reactor were about 1700 grams per hour with 0.20% of this exhaust gas being nitrogen oxides. The temperature of the exhaust gases was about 73° F. The volumetric efficiency of the reaction in this example was 16.3 pounds of nitric acid per cubic foot per day.

EXAMPLE 2

Example 1 was repeated except that the temperature of the zone between the lower liquid section and the packing in the upper portion of the reactor tower was maintained at about 121° F. The amount of acid initially charged to the unit was about 1602 grams (100% $HNO_3$) added as a 25.2% aqueous solution. After 4 hours of reaction time the amount of acid removed from the unit was 2936 grams (100% $HNO_3$) and the concentration of the acid recovered was 28.1%. The acid produced was 1334 grams (100% $HNO_3$) and represented a yield of 80.3%. The exhaust from the tower reactor was 1700 grams per hour of which 0.38% represented nitrogen oxides. The volumetric efficiency of the reactor in this example was 14.4 pounds of nitric acid per cubic foot per day.

EXAMPLE 3

Example 1 was repeated except that the temperature of the zone between the liquid in the lower zone and the packing in the upper zone of the reactor was maintained at about 159° F. The amount of acid initially charged to the unit was 1325 grams (100% $HNO_3$) added as a 24.3% aqueous solution. After 4 hours of reaction time the amount of acid removed from the unit was 2708 grams (100% $HNO_3$) and the concentration of the acid recovered was 30.3%. The acid produced was 1383 grams (100% $HNO_3$) and represented a yield of 84.2%. The exhaust from the tower reactor was about 1500 grams per hour of which 0.71% represented nitrogen oxides. The volumetric efficiency of the reactor in this example was 15.4 pounds of nitric acid per cubic foot per day.

EXAMPLE 4

This example was run using a reactor similar to the one shown in FIG. 3. This reactor differed slightly in its dimensions from the reactor employed above in Examples 1, 2and 3 and was provided with gas sample ports at points A, B, C and D as shown in FIG. 3.

Ammonia at a rate of 101.0 grams per hour and air which had been dried, at a rate of 1315 grams per hour were fed into a conventional gas mixer and then into a catalytic reactor fitted with a platinum gauze catalyst. The platinum gauze catalyst was a 3 layer circular disc 3 inches in diameter, and was formed from, by weight, 90% platinum-10% rhodium wire, having a diameter of 0.003 inches, and had a mesh size of 80 × 80. The platinum gauze catalyst was maintained at a temperature of about 1700° F. The reaction of the ammonia and oxygen from the air was initiated by heating a small spot in the platinum wire catalyst with a small electric arc. After initiation, the reaction spread slowly over the rest of the wire gauze. This took between 1 and 2 minutes. The composition of the off-gases from the catalytic burner was measured by conventional gas phase chromatography techniques and was found to be as follows:

|  | Percent by Weight |
| --- | --- |
| Oxygen | 6.20 |
| Nitrogen | 83.60 |
| Nitrogen Oxide (reported as NO$_2$) | 9.86 |
| Nitrous Oxide | 0.35 |

The temperature of the air-nitrogen oxide mixture was cooled to about 88° F. This gas stream was then fed into a vertical tower reactor similar to the one shown in FIG. 3. This reactor was generally cylindrical and was made from stainless steel and was approximately 180 inches in height. The lower 60 inch portion of this reactor was approximately 4 inches in diameter with the upper 120 inch portion was approximately 3 inches in diameter. The top one foot portion of the tower diameter was 4 inches in diameter. The volume of this tower reactor was about 1823 cubic inches. The liquid level in the lower portion was about 19 inches deep. The base of the reactor was provided with an outlet that was approximately ½ inch in diameter so that liquid could be withdrawn from the reactor. In the wall of the reactor between the upper packed portion and the liquid level was located the inlet through which the gas stream from the ammonia-oxygen burner, with added air, was admitted to the reactor.

An inlet approximately one quarter inch in diameter was located about 6 inches from the top of the reactor through which an aqueous nitric acid solution was admitted to the reactor. As the reaction proceeded the aqueous nitric acid solution was continuously fed into the reactor through this inlet at a rate of about 14,060 grams per hour. At the top of the reactor an outlet approximately ¼ inch in diameter was provided through which the exhaust gases passed out of the reactor. The liquid in the lower portion of the reactor was maintained at about 200° F. The temperature of the packed upper portion of the reactor 10 inches above the wire gauze supporting the packing was determined by thermocouple to be about 60° F. while the temperature of the nitric acid at the inlet was determined by thermocouple to be about 40° F.

As shown in FIG. 3, the reactor was provided with ports through which gas samples could be withdrawn from the reactor and analyzed, these ports being shown at points A, B, C and D. The gas port at point A was between the inlet 25, through which the nitrogen oxides-oxygen feed gas mixture entered the reactor 14, and the liquid level in the desorber region 15 of the reactor. The gas port at point B was just below (approx. 2.5 inches) the packing 18 in the stripper region 17 of the reactor. The gas port at point C was in the packing 18 in the stripper zone 17 just below (approx. 6 inches) the point at which two portions of the reactor were joined. This gas port was adjacent the cooling coil 23 in the stripper region 17. The gas port at point D was at a point just above where the two portions of the reactor were joined.

After the gaseous products from the ammonia oxidation, with added air, had been admitted to the reactor and the reaction had proceeded for a while the temperature in the portion of the reactor between the upper packed portion and the liquid level in the lower portion was determined to about 130° F.

As the reaction proceeded an aqueous nitric acid solution was continuously recycled to the tower reactor by collecting the stream of nitric acid withdrawn from the reactor through the outlet in the base of the unit. Before the reaction was initiated 1159 grams (100% HNO$_3$) of nitric acid was charged to the reactor. This acid was added as a 21.8% aqueous solution. As previously mentioned the recycle rate of this aqueous solution of nitric acid was about 14,000 grams per hour. The liquid from the reactor may contain some dissolved nitrogen oxides. These unreacted nitrogen oxides are preferably eliminated from the effluent by heating the bottom of the tower reactor. To accomplish this a heating coil was placed in the bottom 1 foot of the reactor. The coil is heated with hot water so that the temperature at the bottom of the tower can be maintained at least about 150° F. so that any gases dissolved in the liquid in the bottom of the reactor would be desorbed. These desorbed gases passed up the tower reactor to be converted to nitric acid. Liquid withdrawn from the reactor was cooled and recycled to the reactor to maintain the stream of aqueous nitric acid into the tower reactor.

After 4 hours of reaction time the amount of acid removed from the unit was 2435 grams (100% HNO$_3$) and the concentration of the acid recovered was 26.1%. The acid produced was 1276 grams (100% HNO$_3$) and represented a yield of 85.3%. It was found that the exhaust gases from the tower reactor were about 1750 grams per hour with 0.80% of this exhaust gas being nitrogen oxides. The temperature of the exhaust gas was about 75° F.

As the reaction proceeded, samples were taken from the reactor through gas ports A, B, C and D and analyzed by means of conventional gas chromatographic procedures. The results of these analysis were

|  | O$_2$ | N$_2$ | NO$_x$(as NO$_2$) | N$_2$O |
| --- | --- | --- | --- | --- |
| A | 7.2% | 83.3% | 9.16% | 0.32% |
| B | 7.3% | 82.6% | 9.92% | 0.30% |
| C | 7.7% | 90.0% | 2.07% | 0.32% |
| D | 7.8% | 91.1% | 0.80% | 0.33% |

The results of these analysis are shown graphically in FIG. 4. The concentration of reactive nitrogen oxides at point B was 9.92% by weight and the concentration of nitrogen oxides at point C was 2.07% by weight.

Based upon the ammonia feed, the theoretical amount of nitric acid produced by the process was 18.7 lbs. per day per cubic foot of reactor space. It was found that the efficiency of the ammonia oxidation burner was 89.3%. Correcting the 100% ammonia oxidation burner efficiency a yield of 85.6% was attained with the process which represents a volumetric yield of 17.0 lbs. of nitric acid per day per cubic foot of reactor space. The actual conversion rate was 15.8 lbs. of nitric acid per day per cubic foot of reactor space based on actual recovered nitric acid.

Thus, as has been shown the speed and efficiency of the conversion of nitrogen oxides to nitric acid in the process of the present invention with its continuous concentration of nitrogen oxides can be attributed to at least three factors. First, the process provides an efficient system for extracting nitrogen oxides (principally nitric oxide) even in low concentrations from the reactor off-gases and returning these nitrogen oxides to a nitrogen oxide rich reaction region for conversion to nitric acid. Second, the process provides a high concentration of reactive nitrogen oxides which is in continuous contact with a liquid so that nitrogen oxides are readily converted to nitric acid. Third, the process provides an efficient system for extracting dissolved nitrogen oxides from the liquid which is employed in the process and concentrates these nitrogen oxides to that they can readily be converted to nitric acid.

We claim as our invention:

1. A continuous process for the preparation of nitric acid comprising:
   a. providing a reaction zone having a stripper region within said reaction zone for absorbing gaseous reaction products including nitrogen dioxide and a desorber region within said reaction zone for removing dissolved gaseous reaction products from an aqueous nitric acid solution and a concentration region between said stripper and desorber regions;
   b. maintaining said reaction zone at about atmospheric pressure;
   c. continuously introducing a first stream of aqueous nitric acid containing from about 10 to about 40% nitric acid into said stripper region so that first stream passes through said stripper region and said concentration region and into said desorber region at a rate sufficient to allow maintainance of a predetermined level of aqueous nitric acid in said desorber region;
   d. continuously introducing gaseous ammonia oxidation products and a gaseous oxidizing agent including molecular oxygen into said concentration region;
   e. reacting the ammonia oxidation products and the oxidizing agent in the presence of said first stream to produce gaseous reaction products including nitrogen dioxide and liquid reaction products including nitric acid which combine with said first stream to enrich the nitric acid content thereof;
   f. maintaining the temperature of said first stream as it passes through the stripper region in the range of from about 40° F. to about 100° F. to dissolve at least a major amount of the gaseous reaction products entering the stripper region into said first stream;
   g. maintaining the temperature of the aqueous nitric acid in the desorber region at a temperature of at least 130° F. to liberate at least a major amount of the dissolved gaseous reaction products therein;
   h. withdrawing a second stream having the enriched nitric acid content from the liquid in the desorber region at a rate allowing maintenance of said predetermined liquid level;
   i. separating said second stream into a product stream and a recycle stream;
   j. continuously introducing said recycle stream into stripper region to provide said first stream; and
   k. adding $H_2O$ to said stripper region, the amount and rate of $H_2O$ added, and product stream being separated, being coordinated to provide said first stream having a $HNO_3$ concentration in the range of from about 10 to about 40% by weight.

2. The process of claim 1 wherein the reaction zone is vertical and said vertical zone has an upper zone, lower zone and an intermediate zone.

3. The process of claim 1 wherein said first stream of aqueous nitric acid contains from about 20 to about 30% nitric acid.

4. The process of claim 1 wherein said gaseous oxidizing agent including molecular oxygen is present in an amount sufficient to increase conversion of nitric oxide to nitrogen dioxide.

5. The process of claim 1 wherein the temperature of said ammonia oxidation products and said oxidizing agent is between about 100° F. to about 200° F.

6. The process of claim 1 wherein the temperature of the aqueous nitric acid in the desorber zone is maintained at a temperature of at least about 150° F.

7. The process of claim 1 wherein said product stream is separated at a rate and an amount such that the amount of nitric acid removed is equal to the nitric acid produced in the process.

8. The process of claim 1 wherein the product stream is concentrated to provide a stream of water and a stream of concentrated nitric acid, said stream of water being added to said recycle stream to provide said first stream of aqueous nitric acid.

9. A continuous process for the preparation of nitric acid comprising:
   a. providing a reaction zone having a stripper region within said reaction zone for absorbing gaseous reaction products including nitrogen dioxide, a desorber region within said reaction zone for removing dissolved gaseous reaction products from an aqueous nitric acid solution and a concentration region between said stripper and desorber regions;
   b. maintaining said reaction zone at about atmospheric pressure;
   c. continuously introducing a first stream of aqueous nitric acid containing from about 10 to about 40% nitric acid into said stripper region so that first stream passes through said stripper region and said concentration region and into said desorber region at a rate sufficient to allow maintenance of a predetermined level of aqueous nitric acid in said desorber region;
   d. continuously introducing gaseous ammonia oxidation products and a gaseous oxidizing agent including molecular oxygen into said concentration zones;
   e. reacting the nitrogen oxides and the oxidizing agent in the presence of said first stream to produce gaseous reaction products including nitrogen dioxide and liquid reaction products including nitric acid which combine with said first stream to enrich the nitric acid content thereof;
   f. maintaining the temperature of said first stream as it passes through the stripper region in the range of from about 40° F. to about 105° F. to dissolve at least a major amount of the gaseous reaction products entering the stripper region into said first stream;
   g. maintaining the temperature of the aqueous nitric acid in the desorber region at a temperature of at least 130° F. to liberate at least a major amount of the dissolved gaseous reaction products therein:
   h. withdrawing a second stream having the enriched nitric acid content from the liquid in the desorber region at a rate allowing maintenance of said predetermined liquid level;
   i. separating said second stream into a product stream and a recycle stream;
   j. continuously introducing said recycle stream into stripper region to provide said first stream; and
   k. adding $H_2O$ to said stripper region, the amount and rate of $H_2O$ added, and product stream being separated, being coordinated to provide said first stream having a $HNO_3$ concentration in the range of from about 10 to about 40% by weight.

10. The process of claim 9 wherein the reaction zone is vertical and said vertical zone has an upper zone, lower zone and an intermediate zone.

11. The process of claim 9 wherein said first stream of aqueous nitric acid contains from about 20 to about 30% nitric acid.

12. The process of claim 9 wherein said gaseous oxidizing agent including molecular oxygen is present in an amount sufficient to increase conversion of nitric oxide to nitrogen dioxide.

13. The process of claim 9 wherein the temperature of said ammonia oxidation products and said oxidizing agent is between about b 100° F. to about 200° F.

14. The process of claim 9 wherein the products stream is concentrated to provide a stream of water and a stream of concentrated nitric acid, said stream of water being added to said recycle stream to provide said first stream of aqueous nitric acid.

15. The process of claim 9 wherein said product stream is separated at a rate and an amount such that the amount of nitric acid removed is equal to the nitric acid produced in the process.

* * * * *